UNITED STATES PATENT OFFICE.

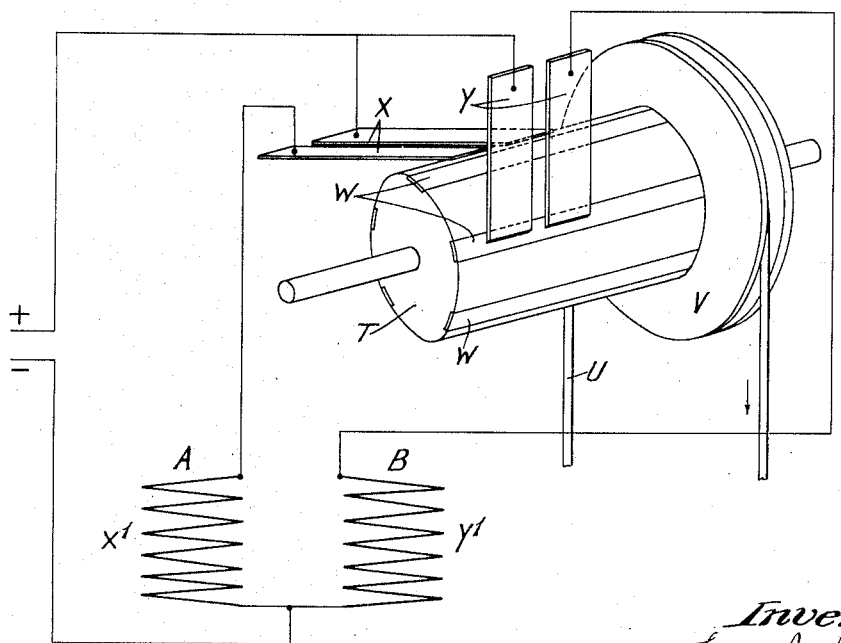

FRANK JOHN SPENCER AND WILLIAM JOHN KEILY, OF LEICESTER, ENGLAND, ASSIGNORS TO GIMSON & CO., (LEICESTER) LIMITED, OF LEICESTER, ENGLAND, A CORPORATION OF GREAT BRITAIN.

MOTOR-DRIVEN MACHINE FOR THE MANUFACTURE OF BOOTS AND SHOES.

1,308,305. Specification of Letters Patent. Patented July 1, 1919.

Application filed March 16, 1916. Serial No. 84,702.

*To all whom it may concern:*

Be it known that we, FRANK JOHN SPENCER and WILLIAM JOHN KEILY, both subjects of the King of Great Britain, residing at Leicester, in the county of Leicester, England, have invented certain new and useful Improvements in Motor-Driven Machines for the Manufacture of Boots and Shoes, of which the following is a specification, reference being had therein to the accompanying drawing.

This invention has reference to machines employed in the manufacture of boots and shoes, and concerns also electrical apparatus applicable to such machines for obtaining and imparting oscillations or vibrations of high frequency, the said apparatus being suitable for application in other directions as well as for the purpose mentioned.

The main object of the invention is to provide an edge-setting machine wherein the movements of the iron or tool are imparted by electrical means. For instance in the improved machine a rapid vibrating movement may be imparted to the tool or iron by means of one or more electro-magnets suitably arranged and entirely dispensing with rotary mechanical devices, cams and like parts.

A particular feature of the improved machine above mentioned is an elasticity of motion of the tool or iron rendered possible by an arrangement of the armature or armatures in a floating condition, the movements taking place without rigid control in any direction.

An important feature of the present invention is the electrical device or means designed to give oscillations or vibrations of very high frequency, such means not only being used by preference in the before mentioned edge-setting machine, but being applicable also in other directions such for example as for use in other machines where a very high frequency vibration or oscillation is desirable or necessary as for instance burnishing machines, dental machines, medical and other machines and apparatus for vibro-massage treatment and so on.

The characteristic feature of this electrical device is the use in conjunction with a suitable contact breaker or magnetic induction device of two electric-magnets the coils of which are wound and arranged to give a mutual inductance of one in the other whereby upon the passage of current through the coils of the respective magnets alternately, the induced current will facilitate and quicken the magnetization and demagnetization of the said coils and thus bring about a very high frequency oscillation or vibration of the armature. In this arrangement when the circuit of one electromagnet is made and broken the induced current set up in the coil of the other acts to magnetize and demagnetize it this action occurring alternately between the two coils.

More than one pair of coils may be employed in the same device such plurality of pairs operating from the same contact breaker, or separate contact breakers may be used for the different pairs of coils.

In the electrical device having the above mentioned characteristic feature, the coil of each magnet may have two windings, the primary windings of the coils being independent of each other and taking the current but the secondary windings of the coils being connected.

When current is passed through the primary winding of one coil, induced current is set up in the secondary winding of this coil and as the said secondary winding is connected with the corresponding winding of the other coil induced current is also set up in this latter coil which is influenced thereby in such a manner as to bring about the result herein before mentioned. By means of a contact breaker or oscillating or vibrating switch, current is sent through the primary windings of the coils alternately.

The armature or a pair of armatures is pivotally mounted in a suitable manner to rock when influenced by the alternately energized magnets, and mounted upon or connected with the axis of said armature is one member of the contact breaker which as the armature rocks coöperates first with one and then with the other of two members located on opposite sides thereof. The contact poles of these outer members may be and preferably are yieldingly mounted so that if the amplitude or stroke of the armature varies the said pole members will be self adjusting.

The armature or pair of armatures is controlled by springs, preferably slightly unbalanced to render the apparatus self starting, the strength of said springs being such that the vibrations of the armature which would be caused by said springs alone, if the armature were forcibly deflected from balanced position and released, will correspond as nearly as possible to the oscillations which would be imparted by the electro-magnets, if the springs were not present. That is, the springs have a regulating effect on the action of the magnets on the armature, or, it may be considered that the magnets, after the operation has been started, act to overcome the resistance which tends to reduce the amplitude of the vibrations of the armature by the springs. In the specific application hereafter described, these spring have a further function in that they act to resist the upward pressure of the work against the tool and enable the use of knife-edge bearings for the tool-supporting shaft.

Employed in conjunction with the electrical apparatus may be suitable resistances arranged to be inserted and cut out as required to vary the frequency and amplitude of the armature vibrations.

The invention and also the previously mentioned specific application of the electrical device will be hereinafter fully described with reference to the accompanying drawings wherein:—

Fig. 5 is a diagram of a modification.

Where like parts are shown in more than one figure they are designated by the same reference characters.

Figure 1:
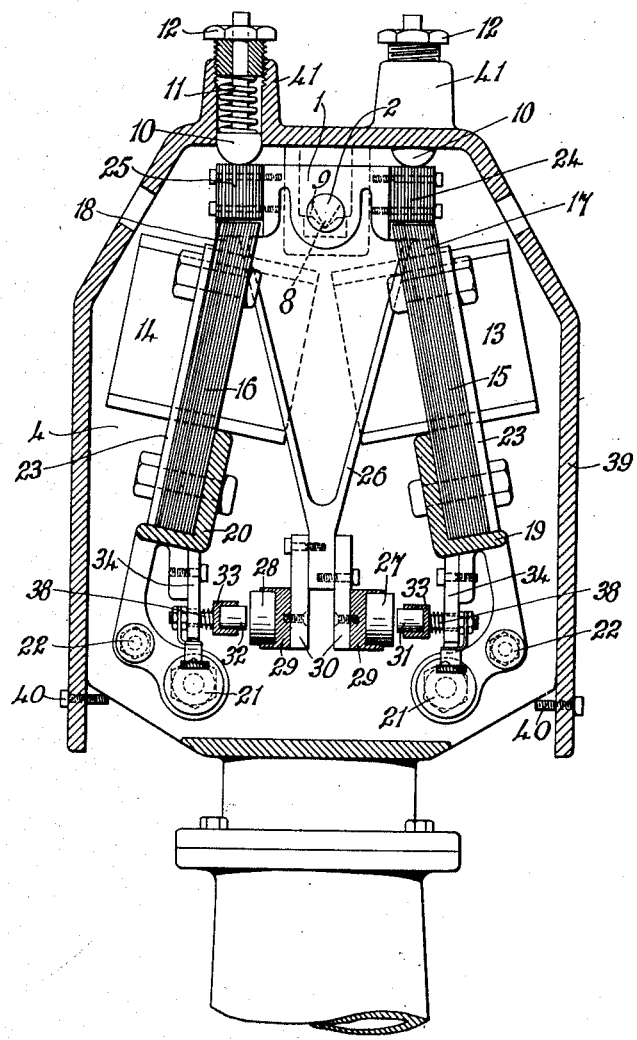
Figure 1 is a sectional front elevation of an electrical edge setting machine according to this invention.

One form of the electrical device comprises two electro-magnets A, B (Fig. 3) the respective coils of which have primary windings $P^1$, $P^2$ and also secondary windings $S^1$, $S^2$. For the sake of clearness the secondary windings are, in the diagram, shown removed from the interior of the primary windings but it will be understood that in practice the secondary windings are situated within or in inductive relation to the respective primary windings but do not have any connection with the same. The positive current wire C is connected to one end of each primary winding $P^1$ $P^2$ and the negative current wire D is connected to the opposite end of the said windings through contact breakers E, F. The secondary windings $S^1$, $S^2$ are connected with each other reversely as shown; that is, the arrangement is such that, when one primary winding is energized, an induced current will be caused to flow in its corresponding secondary winding in one direction, thereby causing a flow of current in the other secondary winding opposite in direction to the flow of current which is induced in the latter winding when its corresponding primary winding is energized, so that the flow of current in one primary winding, which causes a magnetizing effect on its magnet, so as to attract its armature, will, through said secondary windings, cause a de-magnetizing effect on the magnet of the other primary winding. The contact breakers E, F are operated in alternation to pass current through the windings $P^1$, $P^2$ alternately so that the armature G is alternately attracted on the opposite sides of its fulcrum H by the electro-magnets A, B and an oscillation thereof is brought about.

When current is passed through the primary winding P' to magnetize its magnet A, and attract its armature, induced current is set up in the secondary winding S', in one direction, which, by reason of its reversed connection with the secondary winding $S^2$, causes a like flow of current therein in a relatively opposite direction to that which would be normally induced therein by the magnetizing current in its corresponding primary winding $P^2$ which tends, by induction, to reverse the flow of the magnetizing current in the latter, thereby tending to cause its magnet B to be demagnetized. In like manner, the magnetizing current in the primary winding $P^2$ induces an opposite flow of current in the secondary windings, and a corresponding demagnetizing and pole-changing effect on the magnet A of the primary winding P. Thus there is a mutual inductance of one coil in the other which facilitates and quickens the magnetizations and demagnetization of the primary coils and brings about a very high frequency oscillation or vibration of the armature G.

In the specific application of the aforesaid electrical apparatus to an edge-setting machine, an armature member 1 (Figs. 1 and 2) is mounted upon an axis conveniently in the form of a spindle or rockshaft 2 carried in bearings 3 in a frame 4 and having preferably at each end thereof a depending arm or fitment 5 furnished with a holder 6 of suitable form in which one or more edge-setting irons 7 can be detachably mounted. The fitment 5 is rigidly mounted upon the spindle 2 so that the oscillations of the latter will be transmitted to the tool.

The portions of the spindle which pass through the bearings 3 are formed with knife or angular edges 8 at the under side which edges rest and rock upon the bottom of the bore 9 of the bearings as shown in Fig. 1. The spindle 2 is held down, or said knife-edges are held against the bottom of said bore, by means of two spring pressed bolts 13

10 applied to the ends of the armature member 1 and situated one on each side of the center of oscillation. The springs 11 controlling the bolts 10 yield alternately to permit the oscillation of the member 1 to take place and their operative pressure upon the bolts 10 may be adjusted by rotating the screwed plugs 12, through holes in which the shanks of the bolts work up and down. When the work is pressed against the edge-setting irons 7, an upward pressure is exerted on the spindle 2, which will tend to lift the same from its knife-edge bearings, but this action is overcome by the springs 11, which act in opposition to this pressure. The springs 11 also have a regulating effect on the oscillating action of the armatures on the spindle, as hereinbefore indicated. Instead of the described arrangement of compression springs and bolts, tension springs may be employed these being connected to the ends of the armature member and anchored to a suitable part of the frame.

Figure 2:
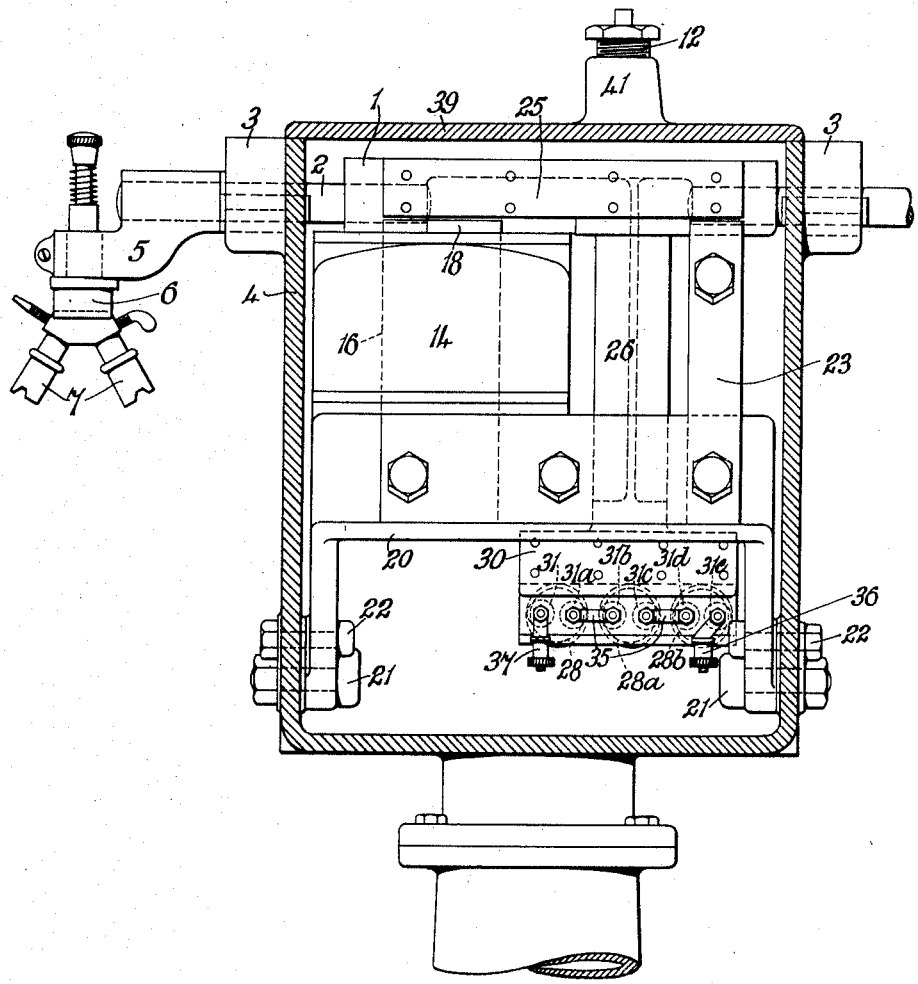
Fig. 2 is a sectional side elevation of the same.

The coils 13, 14 of the electro-magnets are situated one on each side of the center of movement and are mounted by means of the core stampings 15, 16 which at the upper termination form pole pieces 17, 18 and at the lower end are firmly secured to frame castings 19, 20 these being carried upon pivot pins 21 passed through the sides of the machine frame 4. The frame castings and coils may be swung downward out of position when necessary by turning the said castings upon the pivot pins 21, said parts being kept in the working position by locking pins 22 passed through alined holes in the frame 4 and castings 19, 20. In side view as shown in Fig. 2, the core stampings form a square U and are firmly clamped upon the frame castings by an L shaped plate 23.

The armature member 1 is firmly secured to the spindle 2 and upon opposite sides of the fulcrum is furnished with stampings 24, 25 (Fig. 1) constituting the armatures proper which coöperate respectively with the pole pieces 17, 18 of the coils 13, 14. These stampings as shown in Fig. 2 extend along the sides of the member 1 so as to coöperate with both ends of the U shaped core stampings, sufficient space being provided between the armature stampings and their respective pole pieces for the requisite oscillation of the armature to take place.

Firmly connected to or with the armature member and depending therefrom is an arm 26 which at or near its lower extremity carries contact devices consisting preferably of carbon disks 27, 28 mounted in sockets 29 attached to insulating material 30 in turn secured to the arm 26. The contacts 27, 28 alternately coöperate with respective companion devices consisting of carbons 31, 32 in holders 33 yieldingly supported by plates 34 of insulating material attached to the frame castings 19, 20. The carbons on each side are connected up in pairs by plates 35 (Fig. 2), and terminals 36, 37 are furnished for the lead wire connections. Circuit is completed between the unconnected pairs of carbons by the carbon disks on the oscillating arm. For instance when the arm moves to the left (Fig. 1), the contact disks 28, 28$^a$, 28$^b$, (Fig. 2) form an electrical connection between the respective pairs of carbons 32—32$^a$, 32$^b$—32$^c$, 32$^d$—32$^e$ thus completing the connection between the terminals 37 and completing the circuit to energize one of the magnets. When the arm moves to the other side the contact is made in a similar manner by the disks 27 and carbons 31 it being understood that contact is made first on one side and then on the other whereby the coils 13, 14 are energized in rapid alternation. Any variation in the stroke of the arm 26 is compensated for by the springs 38 behind the holders 33 which allow the latter to yield against the contactual engagement of the carbon disks with the carbons.

The frame 4 is provided with a detachable cover 39 held in place by set screws 40 (Fig. 1) the said cover having formed thereon hollow bosses 41 in which the before mentioned bolts 10 and their springs are situated. The frame 4 and cover 39 are preferably so formed as to constitute a housing to completely inclose the electro-magnets and contact breaker the only exposed moving parts being the fitments 5 and parts carried by the same.

Figure 3:
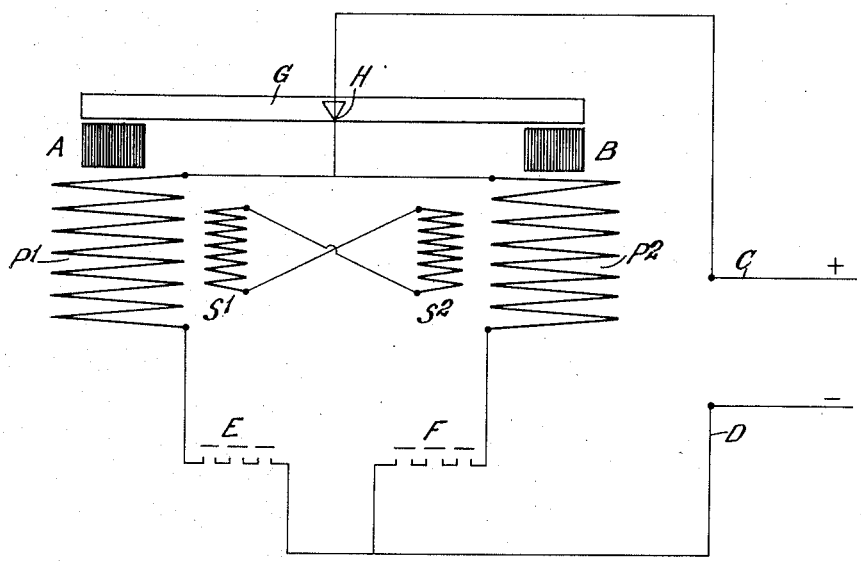
Fig. 3 is a diagram showing the windings and connections of the coils of the electrical device.

In the machine described the coils of the electro-magnets may have primary and secondary windings such as hereinbefore described with reference to Fig. 3.

Figure 4:
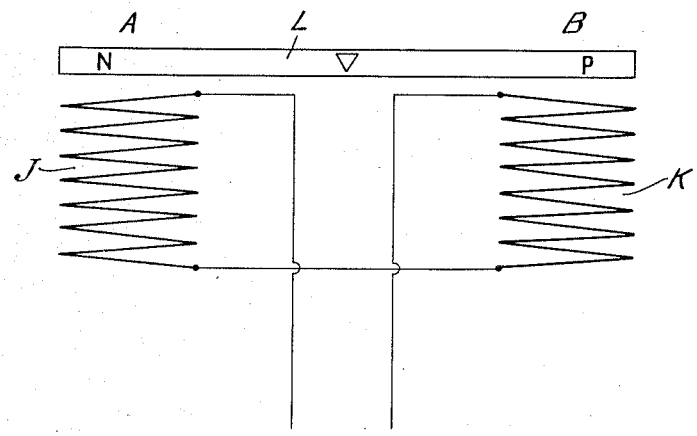
Fig. 4 is a diagram showing a coil arrangement suitable for alternating current.

In a modified arrangement of electrical device shown in Fig. 4, suitable for the machine and working with alternating current, the coils of the two electro-magnets A, B have windings J, K and the armature L is polarized so that the oscillations thereof are set up by the current passing through the coils, no contact breakers or secondary windings being necessary. This arrangement may be used in the machine instead of the electrical device previously described.

Further, the employment of contact breakers or induction devices actuated separately from but in synchronism with the machine by mechanical or other means is also within the scope of this invention as it is not essential that the contact breaker should be actuated directly by the armature as hereinbefore described.

An example of an arrangement of this character is illustrated in Fig. 5 where a barrel or drum T of or covered with insulating material is rotated by a belt U and pulley V from a suitable source of power. Conducting strips W in the barrel complete the circuit between pairs of brushes X, Y to energize the coils $X^1 Y^1$ of the electro-magnets A, B, the strips being so spaced in relation to the disposition of the brushes that the circuit is completed at the different pairs X, Y at different times thereby energizing the coils $X^1$, $Y^1$ alternately.

What we claim then is:—

1. A device of the character described having an oscillatory armature, a pair of electro-magnetic primary coils for oscillating said armature, a secondary coil arranged in inductive relation to each of said primary coils and reversely connected in series to cause the current induced in said secondary coils, by the energization of one primary coil, to produce a deënergizing effect on the other primary coil.

2. A device of the character described having an oscillatory armature, means to oscillate said armature comprising a pair of electro-magnetic coils arranged to act oppositely thereon, means to control the current to said coils, to energize them alternately, and a pair of connected secondary coils respectively arranged to be energized by either primary coil, to produce a deënergizing effect on the other primary coil.

3. A machine of the character described comprising an oscillatory armature and a tool adapted to be oscillated thereby, a pair of electro-magnetic coils adapted and arranged, when energized, to oscillate said armature, means to control the current to said coils to cause alternate energization thereof, and means, acting by induction, for causing the energizing current of each coil to produce a deënergizing effect on the other coil.

4. A machine of the character described having a tool-oscillating armature, means to oscillate said armature comprising a pair of electro-magnetic coils arranged to act oppositely thereon, and each composed of a primary and a secondary winding, arranged in inductive relation, said secondary windings of the respective coils being connected with each other, and means to control the current to the primary windings of the coils whereby they are energized alternately, the said primary windings of the respective coils when energized setting up induced current in the secondary windings of the opposite coils, for the purpose described.

5. A machine of the character described comprising a spindle, knife-edge bearings upon which said spindle is mounted to rock, a tool supporting fitment on said spindle, springs arranged to resist oscillation of the spindle in either direction from a position in which the springs are balanced and to hold the spindle on its bearings against pressure of the work, and electrically operated means for oscillating said spindle.

6. A machine of the character described comprising an oscillatory spindle having supporting bearings, a tool-carrying arm on said spindle arranged to be oscillated thereby in positions in which thrust thereon tends to lift the spindle from its bearings, springs arranged to resist oscillation of the spindle in either direction from a position in which the springs are balanced and to hold said spindle on its bearings against thrust on said arm, an armature fast with the spindle, and electro-magnetic-coils to cause oscillation of the armature and spindle, for the purpose described.

7. A machine of the character described comprising a spindle having bearings on which it is arranged to oscillate, a tool arranged to be oscillated by said spindle opposing springs arranged to resist oscillation of the spindle from the balanced position and to hold the spindle on its bearings against pressure of the work, an armature fast with the spindle, electro-magnetic-coils to cause oscillation of the armature and spindle, stationary contact devices, an arm fast with the spindle, and contact devices on said arm coöperating with the stationary contact devices as the spindle oscillates, for the purpose described.

8. A machine of the character described comprising a spindle having bearings on which it is arranged to oscillate, a tool arranged to be oscillated by said spindle, opposing springs arranged to resist oscillation of the spindle from the balanced position and to hold the spindle on its bearings against pressure of the work, an armature fast with the spindle, electro-magnetic-coils to cause oscillation of the armature and spindle, stationary contact devices, an arm fast with the spindle, and contact devices on said arm coöperating with the stationary contact devices, as the spindle oscillates said stationary devices being adapted to yield for the purpose of adjusting themselves to the varying amplitude of the oscillations of the arm.

9. An electrical device for giving oscillations or vibrations of high frequency, comprising a pair of electro-magnets, and means to control the current whereby said magnets are energized alternately, secondary coils in the electro-magnets wound and arranged to give a mutual inductance of one in the other whereby upon the passage of current through the respective magnets alternately, the induced current set up by the secondary coils will facilitate and quicken the magnetization and demagnetization of the said magnets for the purpose described.

10. An electrical device for giving oscillations or vibrations of high frequency, comprising two electro-magnets, means to cause the same to be energized alternately, a coil for each magnet each coil having a primary winding and a secondary winding, the primary windings of the respective coils being independent of each other and taking current, and the secondary windings being separate from the primary windings but connected with each other, for the purpose described.

11. An electrical device for giving oscillations or vibrations of high frequency, comprising an armature, a pair of electro-magnetic-coils to cause oscillation of the armature, a primary winding in each coil, a secondary winding in each coil, said primary windings being independent of each other and taking current, said secondary windings being independent of the primary windings but connected with each other, and a contact breaker device to cause energization of the primary windings alternately.

12. An electrical device for giving oscillations or vibrations of high frequency, comprising an armature, a pair of electro-magnetic-coils to cause oscillation of the armature, a primary winding in each coil, a secondary winding in each coil, said primary windings being independent of each other and taking current, said secondary windings being independent of the primary windings but connected with each other, and current controlling means actuated by the oscillations of the armature to alternately energize the primary windings of the opposite coils, for the purpose described.

In testimony whereof we affix our signatures in presence of two witnesses.

FRANK JOHN SPENCER.
WILLIAM JOHN KEILY.

Witnesses:
E. N. LEWIS,
GEORGE LESTER.